United States Patent [19]
Lowrance et al.

[11] Patent Number: 4,889,259
[45] Date of Patent: * Dec. 26, 1989

[54] APPARATUS FOR INJECTING BALLS INTO A WELL

[75] Inventors: Dan E. Lowrance, Fort Worth; Donald L. Douglas, Stephenville; David W. Merryfield, Mansfield, all of Tex.

[73] Assignee: Special Projects Manufacturing Inc., Ft. Worth, Tex.

[*] Notice: The portion of the term of this patent subsequent to Jul. 26, 2005 has been disclaimed.

[21] Appl. No.: 221,334

[22] Filed: Jul. 19, 1988

Related U.S. Application Data

[63] Continuation-in-part of Ser. No. 926,182, Nov. 3, 1986, Pat. No. 4,759,469.

[51] Int. Cl.⁴ .............................................. B65G 29/00
[52] U.S. Cl. ..................................... 221/75; 29/456; 29/156.8 R; 198/467.1; 198/670; 221/281; 221/197
[58] Field of Search ................... 221/75, 76, 97, 98, 221/281, 287, 197; 29/156.8 R, 434, 456; 198/467.1, 670

[56] References Cited

U.S. PATENT DOCUMENTS

| | | | |
|---|---|---|---|
| 2,693,873 | 11/1954 | Martin | 198/670 |
| 3,715,055 | 2/1973 | Kerdrick et al. | 221/75 |
| 3,815,781 | 6/1974 | Armstrong et al. | 221/75 |
| 4,111,334 | 9/1978 | Winn et al. | 221/75 |
| 4,759,469 | 7/1988 | Lowrance et al. | 221/75 |

Primary Examiner—H. Grant Skaggs

[57] ABSTRACT

A ball dispenser dispenses balls into a flow line leading into a well. The ball dispenser has a subassembly that slides into and out of a cylindrical housing. The subassembly has a shaft that rotates within an array of vertical guide members. A helical flight is secured to the shaft. The subassembly will slide into a loading sleeve for loading purposes. The loading sleeve has a long vertical slot on one side to load the balls onto the flight.

8 Claims, 4 Drawing Sheets

APPARATUS FOR INJECTING BALLS INTO A WELL

CROSS REFERENCE TO RELATED APPLICATION

This Application is a continuation-in-part of application Ser. No. 926,182, filed Nov. 3, 1986, now U.S. Pat. No. 4,759,469, issued July 26, 1988.

BACKGROUND OF THE INVENTION

1. Field of the Invention

This invention relates in general to a method and apparatus for dispensing objects. In particular, the invention relates to a method and apparatus for injecting spherical sealer balls into an oil well.

2. Description of the Prior Art

When an oil or gas well is completed, it is common practice to cement the well casing into the well. The casing is then perforated to allow fluid from the producing formations to flow into the well bore.

In order to increase the productivity of oil and gas wells, producing formations are sometimes treated by hydraulic fracturing and acidizing. Hydraulic treating fluid is pumped into the well bore and exits through the perforations in the casing into the formation.

If some of the perforations are blocked by sediment, or if part of a formation has a lower permeability, part of the formation may not be treated. To ensure that this does not happen, perforation sealer balls are introduced into the treating fluid. The sealer balls seal the open perforations, thus forcing the treating fluid to flow through the other perforations.

Several different types of methods and devices have been devised for injecting sealer balls into a well. These devices must be capable of withstanding the high pressures of the well bore. The devices must also be able to easily and accurately count the number of balls inserted into the well. Sometimes several hundred balls are used, so it is sometimes very difficult to keep up with how many balls have been inserted.

Some prior art ball injectors resemble heavy duty gum ball machines, with complicated mechanisms. The complexity of such machines make them expensive to manufacture and difficult to use and to maintain.

U.S. Pat. No. 3,715,055 (Kendrick et al.) shows a ball injector which has a housing, a rotatable shaft having a helical rib, and a sleeve having a spiral groove. The groove and the rib have different pitches, so they form separate compartments in which the balls are carried. As the shaft is rotated, the balls are forced downward out of the housing. The device is loaded by inverting the housing, dropping balls into the outlet, and rotating the shaft in the opposite direction.

U.S. Pat. No. 4,111,334 (Winn, Jr., et al.) shows a similar ball injector. This device has a housing, a stationary shaft having a spiral groove, and a rotatable sleeve having a helical rib. The sleeve is rotated to move the balls along the shaft. The device is loaded by inserting balls into the top of the device and rotating the sleeve in the normal direction.

Although these devices perform their intended function, the spiral groove makes them expensive to manufacture. It would also be desirable to be able to load the devices more quickly, and to have a simple way to keep a count of the number of balls which have been loaded.

SUMMARY OF THE INVENTION

The ball dispenser of this invention has a housing with a cylindrical inner surface. The housing mounts to the well conduit. A subassembly will slide into the housing. This subassembly is made-up of upper and lower supports connected together by a plurality of vertical guide members. A shaft with a helical flight is rotatably carried in the center of the subassembly. The balls insert between the guide members on the helical flight. The subassembly is removable from the housing for placing balls on the flight and insertable into the housing for dispensing balls into the well conduit.

The guide members each have two flat sides positioned for engagement by the ball. Preferably, the guide members have a V-shape.

A loading sleeve is used to load the balls into the subassembly when the subassembly is withdrawn from the housing. The loading sleeve has a feed slot on one side for inserting the balls. An access slot is located on the opposite side. Gripping members are secured to the subassembly and extend through the slots. This enables an operator to lower the subassembly relative to the loading sleeve.

BRIEF DESCRIPTION OF THE DRAWING

FIG. 2 is a transverse sectional view of the ball injector of FIG. 1, taken along the line II—II of FIG. 1a.

DETAILED DESCRIPTION OF THE INVENTION

Figure 1A:
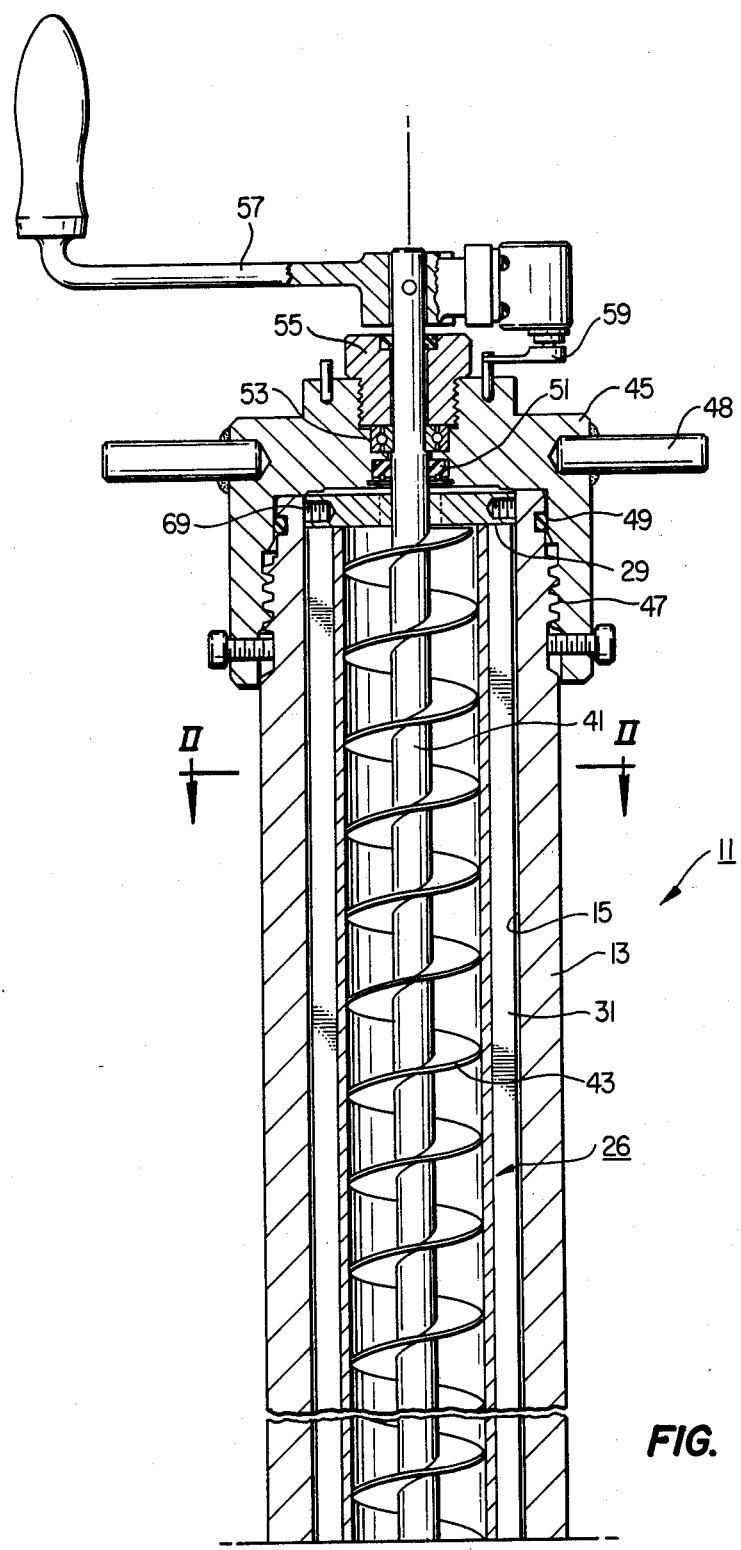
FIGS. 1a and 1b are a sectional view of a ball injector constructed in accordance with this invention.
Figure 1B:
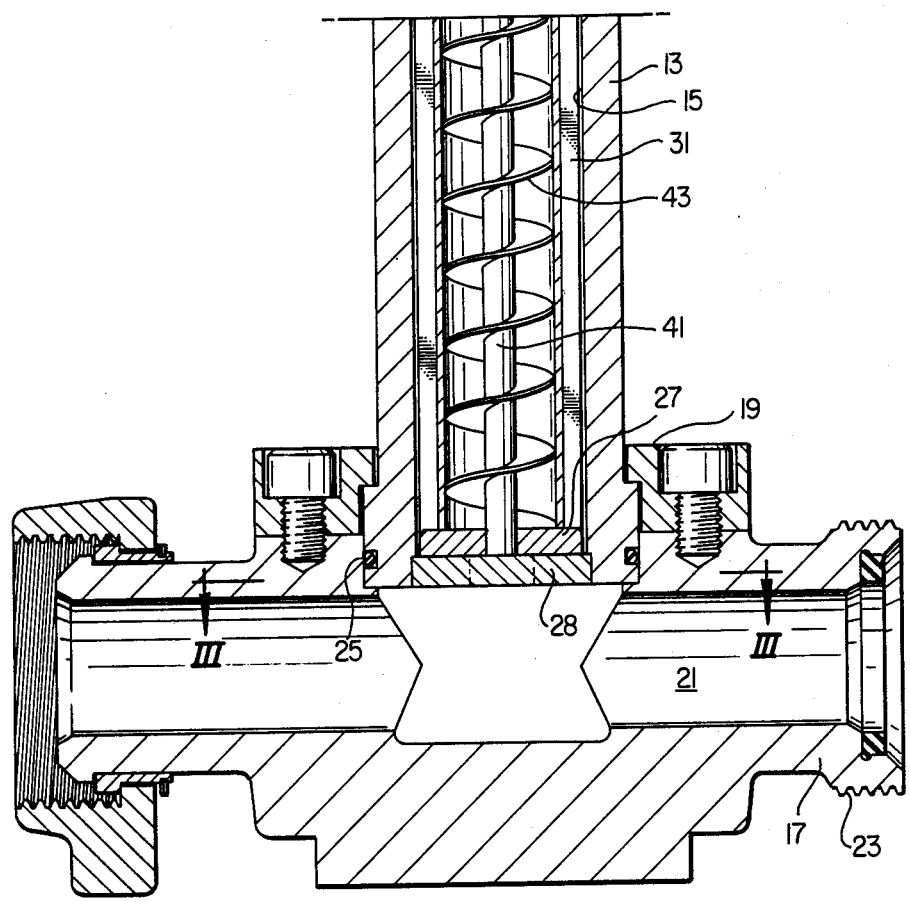

With reference to FIGS. 1a and 1b, ball injector 11 has a cylindrical housing 13. Housing 13 has a cylindrical bore 15. Housing 13 mounts to an adapter 17 on the lower end.

As shown in FIG. 1b, adapter 17 is a tubular member to which the housing 13 is secured by means of a collar 19. The axis of the bore 15 of the housing 13 will be perpendicular to the axis of a passage 21 that extends through the adapter 17. The adapter 17 has threaded ends 23 for connecting into a flow line leading into a well. A seal 25 seals the lower end of the housing 13 to the adapter 17.

A subassembly 26 is removable and insertable into the housing 13. This subassembly 26 includes a lower support 27 (FIG. 1b) and an upper support 29. The subassembly 26 is supported on the bottom by a plate 28 which is rigidly mounted to the lower end of housing 13. The lower and upper supports 27, 29 are flat metal plates. A plurality of guide members 31 are rigidly secured between the lower and upper supports 27, 29. Guide members 31 are vertical and are spaced evenly in a cylindrical array.

Figure 2:
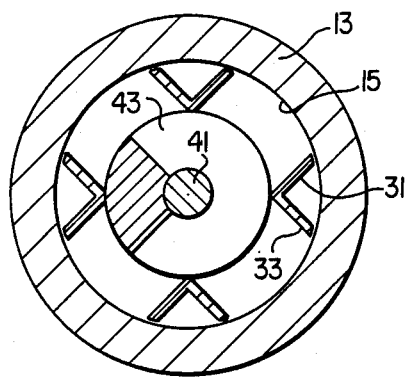

Referring to FIG. 2, in the embodiment of FIGS. 1a, 1b, the guide members 31 each have two flat sides. The flat sides are 90° relative to each other, providing a general V-shape. The flat side 33 of each guide member 31 faces a side 33 of an adjacent guide member 31. Preferably, the sides 33 are parallel to each other. The sides 33 are positioned at acute angles relative to radial lines emanating from the axis of the housing 13.

Figure 3:
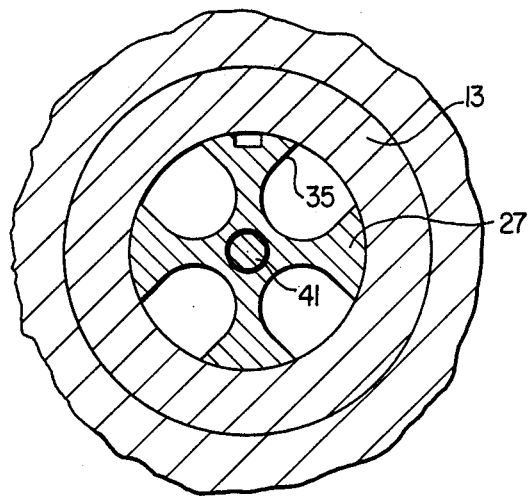
FIG. 3 is a transverse sectional view of the ball injector of this invention, taken along the line III—III of FIG. 1b.

Referring to FIG. 3, the lower support 27 has a plurality of apertures 35. Each aperture 35 is a slot that extends to the circumferential edge of the lower plate 28. The lower plate 28 also has a plurality of apertures (not shown) which align with and are substantially identical in size and shape to the apertures 35.

Figure 5:
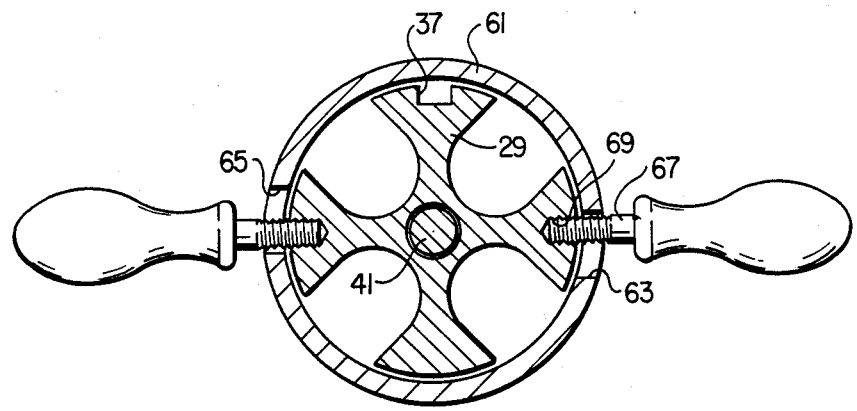
FIG. 5 is a transverse sectional view of the loading sleeve and subassembly.

For ease in manufacturing, the upper support 29 is constructed identical to the lower support 27. Upper support 29 also has a plurality of apertures, as shown in FIG. 5, but they are not functional. A key (not shown) located in the bore 15 of housing 13 engages a vertical slot 37 formed in the upper support 29. Slot 37 and the key prevent rotation of the lower and upper supports 27, 29 and the guide members 31 relative to the housing 13.

Referring again to FIGS. 1a, 1b, the subassembly 26 also includes a rotatable shaft 41. Shaft 41 extends vertically through the center of the subassembly 26. Shaft 41 will coincide with the axis of the housing 13 when the subassembly 26 is located in that bore 15. A helical flight 43 is rigidly secured to the shaft 41. Shaft 41 is rotatable relative to the guide members 31 and lower and upper supports 27, 29.

An end cap 45 screws to the upper end of the housing 13, as shown in FIG. 1a. End cap 45 engages external threads 47 located on the upper end of housing 13. A pair of handles 48 extend outward from opposite sides of the end cap 45. Handles 48 allow the end cap 45 to be easily secured and removed from the housing 13. A seal 49 seals the end cap 45 to the housing 13.

The shaft 41 has an upper end that extends through a passage in the end cap 45. A seal 51 seals around the shaft 41. Bearings 53 are located in the end cap 45 directly above the seal 49 for facilitating the rotation of the shaft 41. A threaded retainer 55 is located above the bearings 53. The upper end of the shaft 41 protrudes above the retainer 55.

In the embodiment FIGS. 1a and 1b, the means to rotate the shaft 41 is shown to be a handle 57. Handle 57 is releasably secured to the upper end of the shaft 41 by means of a pin (not shown). Alternatively, an electric motor is mounted to the upper end of the shaft 41 for rotating the shaft 41. Handle 57 contacts a counter 59 as it rotates to count the number of rotations, and thus the number of balls being dispensed into the well.

Figure 4:
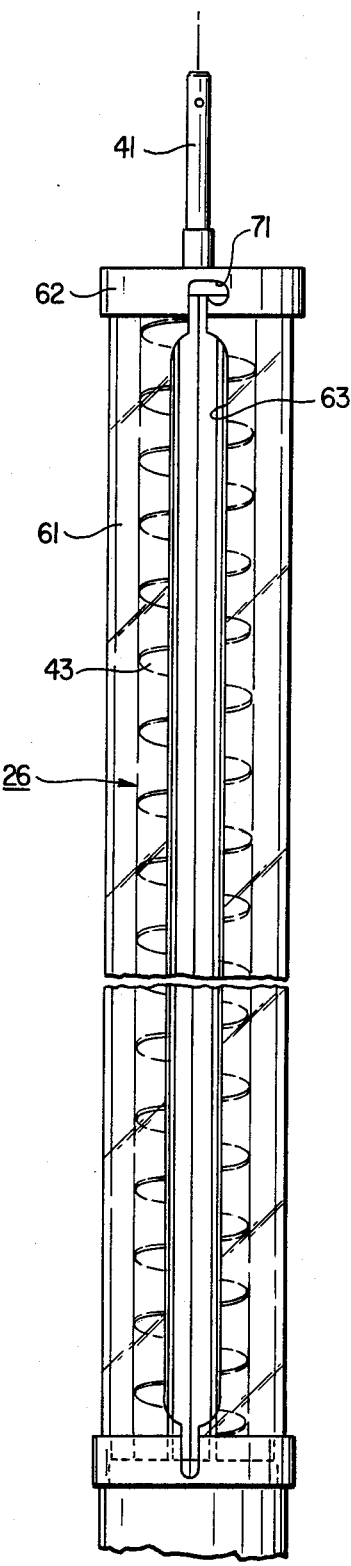
FIG. 4 is a side view illustrating the subassembly of the ball injector of this invention installed within a loading sleeve.

Referring to FIG. 4, the subassembly 26 can be removed from the housing 13 and placed in a loading sleeve 61. Loading sleeve 61 is a tubular member, preferably of a clear plastic material so that any balls loaded into the subassembly 26 can be observed. Metal rings 62 are located on the upper and lower ends of the loading sleeve 61. The loading sleeve 61 has a feed slot 63 on one side. The feed slot 63 extends the full length of the loading sleeve 61. The length of loading sleeve 61 is approximately the vertical height of the helical flight 43. Feed slot 63 has a width that is large enough to receive balls for placement onto the flight 43.

As shown in FIG. 5, an access slot 65 is located 180° from the feed slot 63. Access slot 65 is also a vertical slot approximately the same length of the height of the flight 43. The access slot 65 has a smaller width, however.

Referring still to FIG. 5, a pair of gripping members 67 are adapted to be secured to the upper support 29. Gripping members 67 extend through the slots 63, 65. Each gripping member 67 has a threaded end which engages a threaded socket 69 in the upper support 29. As shown in FIG. 4, each slot 63, 65 has a circumferential upper retaining portion 71 on the upper end that extends through the upper ring 62. The retaining portion will support the gripping members 67 (not shown) to hold the subassembly 26 inside the loading sleeve 61.

In operation, assume first that the subassembly 26 is empty of any balls and is located within the housing 13, as shown in FIGS. 1a and 1b. To load the balls, the user removes the handle 57 and also the end cap 45. He picks up the shaft 41 which causes the entire subassembly 26 to move upward. The removable handle 57 and end cap 45, serve as means for allowing the subassembly 26 to be removed as a unit. He inserts the subassembly 26 into the loading sleeve 61. He secures the gripping members 67 (FIG. 5) to the upper support 29. He locates the gripping members 67 in the retaining slot 71 (FIG. 4). This holds the subassembly 26 within the loading sleeve 61.

The operator then inserts balls (not shown) through the feed slot 63 onto the flight 43. He rotates the shaft 41 to fill all the spaces desired. The guide members 31 will keep the balls from rolling down the flight 43. The balls are sized so that the distance between the inner surfaces of the guide members 31 and the outer surface of the shaft 41 is less than the diameter of the balls, so that the balls cannot roll down the flight 43.

He then will place the loading sleeve 61 on top of the housing 11. The operator removes the gripping members 67 from the retaining portion 71 of the slots 63, 65 (FIG. 4) and lowers the gripping members 67 downward through the vertical portions of the slots 63, 65. The subassembly 26 will slide downward in the loading sleeve 61 into the housing 13.

When the subassembly 26 reaches the lowermost position, the lower support 27 will contact the lower plate 28 (FIG. 1b) which remains fixed to the housing 13. The operator may then remove the gripping members 67. He places the end cap 45 over the shaft 41 and secures the end cap 45 to the housing 13. He then connects a rotation means, such as the handle 57.

The operator will then rotate the handle 57 to dispense balls into the passage 21 (FIG. 1b) as fluid flows through the adapter 17. The balls will drop one at a time through the apertures 35 in the lower support 27 and through the lower plate 28. In the embodiment shown, a ball will drop with each quarter turn of the shaft 41. Any pressure in the passage 21 will also be present inside the housing 13. This pressure will be sealed by the various seals 25, 49, and 51.

Figure 6:
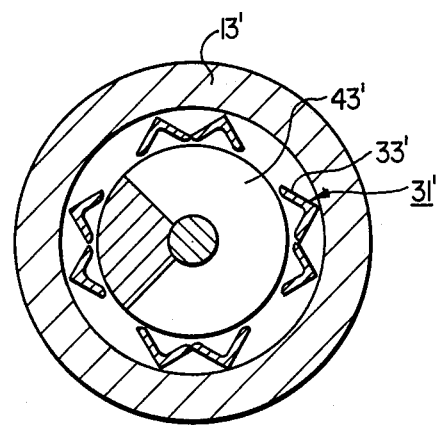
FIG. 6 is a transverse sectional view of the housing and subassembly of an alternate embodiment constructed in accordance with this invention.

In FIG. 6, an alternate embodiment for the subassembly 26 is shown. The guide members 31' are used with a larger diameter of flight 43'. The guide members 31' each have flat slides 33'. However, the configuration is that of a double V or "W-shape".

The invention has significant advantages. The device efficiently dispenses balls without complexity in structure. The ability to remove the subassembly from the housing for loading simplifies and speeds-up the loading procedure. Providing the two slots on each side of the loading sleeve allows an easy way in which to lower the subassembly back into the housing after it has been loaded. The flat sides of the guide members reduce the chance of small diameter balls from being jammed between the flight and a guide member.

While the invention has been shown in only two of its forms, it should be apparent to those skilled in the art that it is not so limited, but is susceptible to various changes without departing from the scope of the invention.

We claim:

1. An apparatus for dispensing balls into a well conduit, comprising:
    a housing having a cylindrical inner surface;
    means for connecting the housing to the well conduit;
    a subassembly having an upper support and a lower support connected together by a plurality of vertical guide members spaced apart from and parallel to each other;
    the subassembly including a shaft having a lower end rotatably engaging the lower support and an upper end extending rotatably through a hole provided in the upper support, the shaft being parallel to the guide members;
    a helical flight rigidly mounted to the shaft for receiving a plurality of balls, the distance between the inner surfaces of the guide members and the outer surface of the shaft being less than the diameter of the balls, so that the balls cannot roll down the flight;
    rotation means engagable with the subassembly for rotating the guide members and the shaft relative to each other to move the balls downward on the flight;
    the lower support having a plurality of apertures, each sized to allow one of the balls to pass through as the flight and lower support rotate relative to each other; and
    the subassembly being removable as a unit from the housing for placing balls on the flight and insertable into the housing for dispensing the balls into the well conduit.

2. The apparatus according to claim 1 wherein the upper support comprises an upper plate mounted to the upper ends of the guide members, the apparatus further comprising:
    an end cap releasably secured to the upper end of the housing above the upper plate; and
    seal means between the end cap and housing for sealing any pressure in the housing.

3. An apparatus for dispensing balls into a well conduit, comprising:
    a housing having a cylindrical inner surface;
    means for connecting the housing to the well conduit;
    a subassembly having an upper support and a lower support connected together by a plurality of vertical guide members spaced apart from and parallel to each other;
    an end cap releasably secured to the upper end of the housing;
    the subassembly including a shaft having a lower end rotatably engaging the lower support and an upper end extending rotatably through a hole provided in the upper support, the shaft being parallel to the guide members;
    a helical flight rigidly mounted to the shaft for receiving a plurality of balls, the distance between the inner surfaces of the guide members and the outer surface of the shaft being less than the diameter of the balls, so that the balls cannot roll down the flight;
    means for preventing rotation of the upper and lower supports and the guide members relative to the housing;
    rotation means engagable with the shaft for rotating the shaft and flight relative to the guide members and housing to move the balls downward on the flight;
    the lower support having a plurality of apertures, each sized to allow one of the balls to pass through as the flight rotates relative to the lower support;
    seal means for sealing the housing with the subassembly contained therein for holding pressure communicated from the well conduit; and
    means for allowing the subassembly to be pulled upward from the housing for placing balls on the flight and lowered back into the housing for dispensing the balls into the well conduit.

4. The apparatus according to claim 3 wherein each of the guide members has at least two flat sides positioned for engagement by one of the balls.

5. The apparatus according to claim 3 wherein each of the guide members in transverse cross-section has a V-shape.

6. The apparatus according to claim 3 wherein each of the guide members in transverse cross-section has a W-shape.

7. An apparatus for dispensing balls into a well conduit, comprising:
    a housing having a cylindrical inner surface;
    means for connecting the housing to the well conduit;
    a subassembly having an upper support and a lower support connected together by a plurality of vertical guide members spaced apart from and parallel to each other;
    an end cap releasably secured to the upper end of the housing above the upper support;
    seal means between the end cap and housing for sealing pressure in the housing;
    the subassembly including a shaft having a lower end rotatably engaging the lower support and an upper end extending rotatably through a hole provided in the upper support and end cap, the shaft being parallel to the guide members;
    a helical flight rigidly mounted to the shaft for receiving a plurality of balls, the distance between the inner surfaces of the guide members and the outer surface of the shaft being less than the diameter of the balls, so that the balls cannot roll down the flight;
    rotation means engagable with the subassembly for rotating the guide members and the shaft relative to each other to move the balls downward on the flight;
    the lower support having a plurality of apertures, each sized to allow one of the balls to pass through as the flight and lower support rotate relative to each other;
    the subassembly being removable from the housing as a unit for placing balls on the flight and insertable into the housing for dispensing the balls into the well conduit;
    a loading sleeve adapted to receive the subassembly once withdrawn from the housing, the loading sleeve adapted to be placed on the upper end of the housing when the end cap is removed;
    a longitudinal feed slot in the loading sleeve extending substantially the height of the flight, the feed slot having a width which is greater than the diameter of the balls, so that the balls can be inserted through the slot, the loading sleeve and subassembly being rotatable relative to each other to allow balls to be inserted through the slot onto the flight in all of the spaces between the guide members;

a longitudinal access slot in the loading sleeve on a side opposite the feed slot, the access slot extending substantially the same length as the feed slot; and a pair of gripping members each adapted to be releasably secured to the upper plate, each adapted to extend through one of the slots for withdrawing the subassembly from the housing into the loading sleeve and for lowering the subassembly from to the loading sleeve back into the housing.

8. The apparatus according to claim 7 wherein each of the slots has a circumferential retaining portion at the upper end thereof for receiving one of the gripping members to support the subassembly within the loading sleeve while loading the balls.

* * * * *